Jan. 12, 1943.    R. C. TOWNSEND    2,307,811
BRAKE MECHANISM
Filed Aug. 30, 1941    2 Sheets-Sheet 2
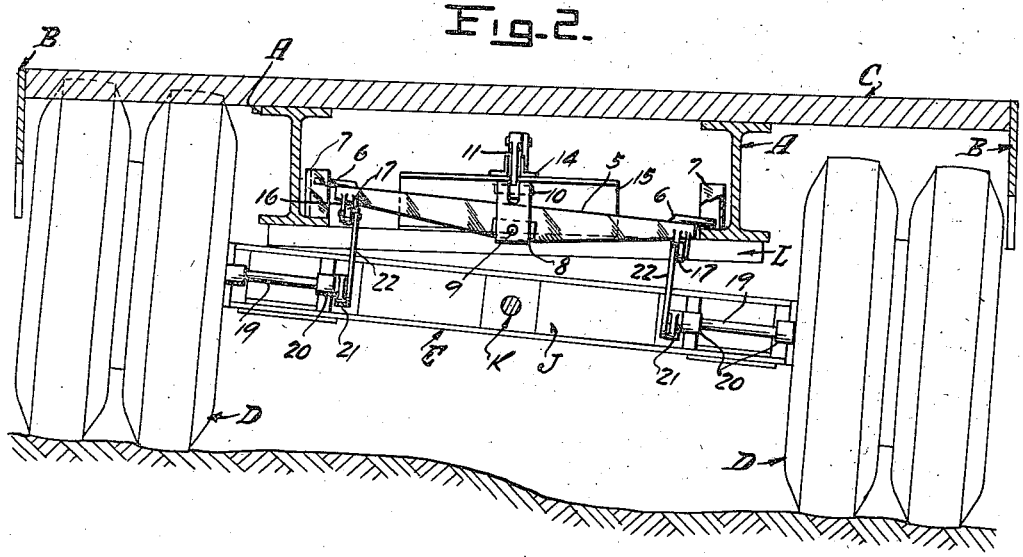
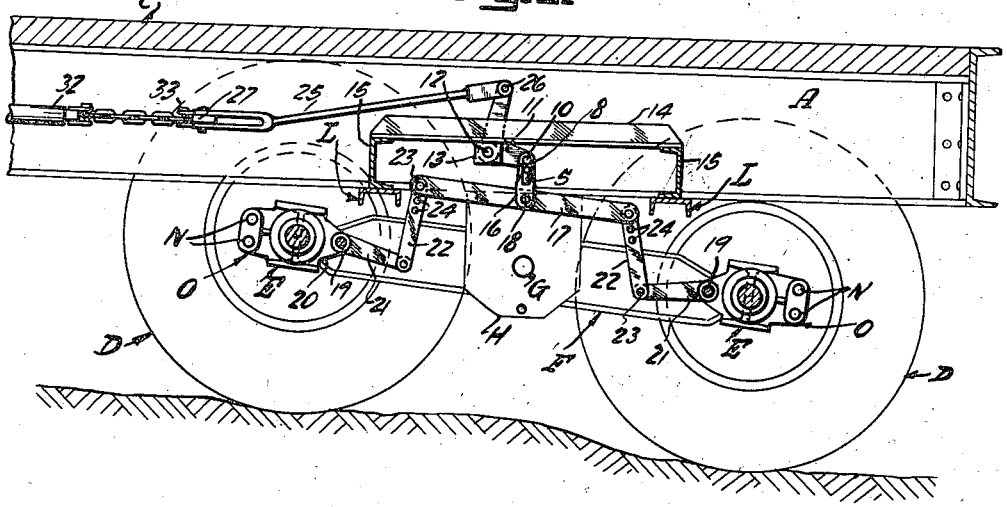
Inventor
ROY C. TOWNSEND
By Carlsen & Hazle Patented Jan. 12, 1943

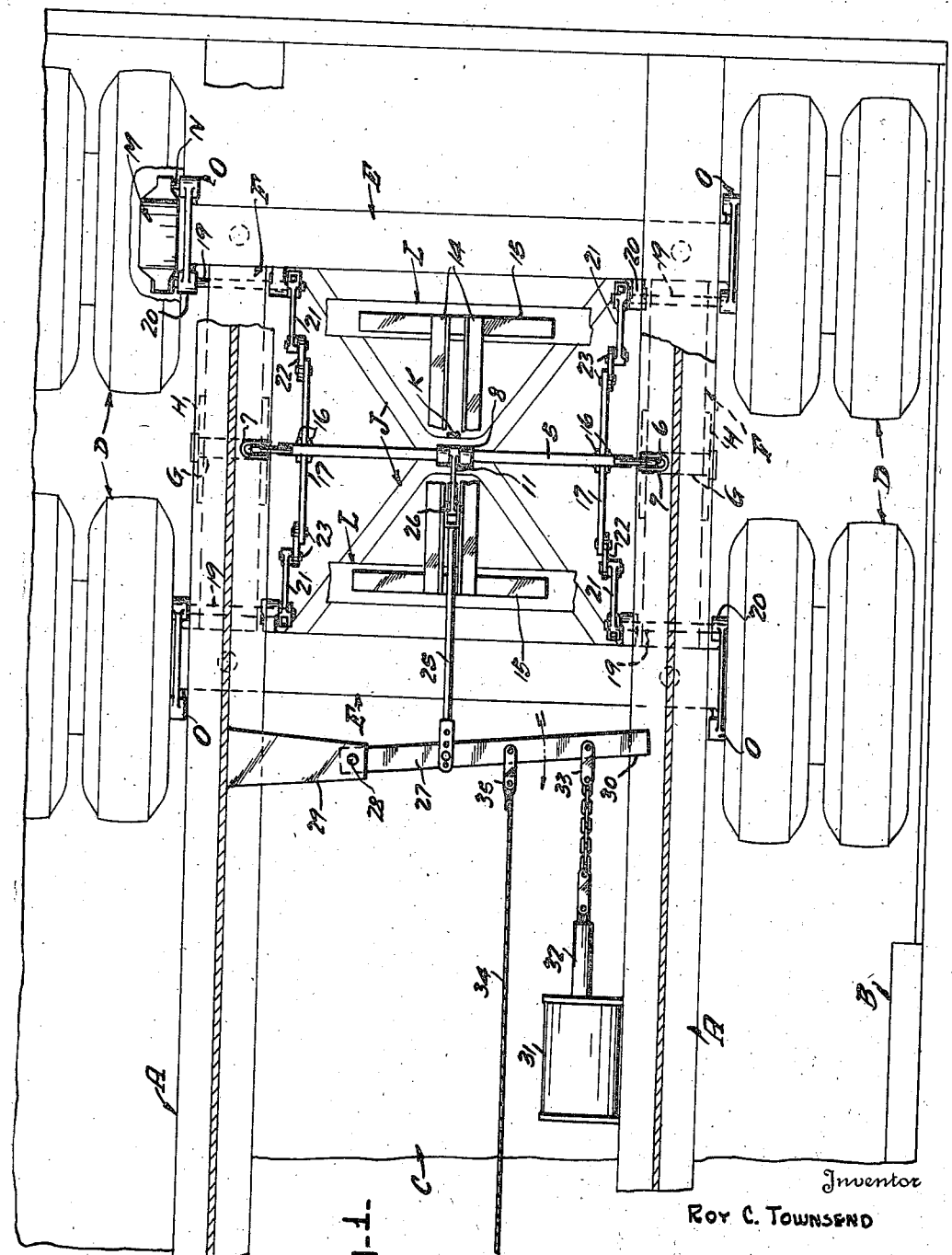

2,307,811

UNITED STATES PATENT OFFICE 2,307,811

BRAKE MECHANISM

Roy C. Townsend, La Crosse, Wis.

Application August 30, 1941, Serial No. 408,981

6 Claims. (Cl. 188—2)

This invention relates to improvements in brake mechanisms for vehicles.

In certain types of vehicles, notably heavy duty trailers and the like, it is desirable to employ differentially mounted wheels having freedom for relative up and down movements to compensate for road surface irregularities and tandem axles are frequently used to provide a sufficient number of wheels to properly distribute the load to the road surface. Obviously the provision and operation of the brakes of such wheels is difficult since equalized braking forces must be employed and the vertically and relatively movable wheels make such equalization hard to obtain.

It is the primary object of my invention to provide an equalized brake actuating mechanism by means of which the braking forces may be equally distributed to all wheels without interference from the differential movements thereof. Another object is to provide a brake mechanism of this kind particularly suited for tandem axle units and by which perfectly equalized braking power may be distributed from one point to each of the four independently operative brake units of the wheels.

These and other more detailed and specific objects will be disclosed in the course of the following specification, reference being had to the accompanying drawings, in which—

Fig. 1 is a fragmentary plan view, partially in horizontal section and partially broken away, showing a tandem axle unit equipped with my improved brake mechanism.

Fig. 2 is a transverse, vertical sectional view of the structure shown in Fig. 1, showing the forward axle and wheels, and associated parts.

Fig. 3 is a fragmentary vertical and longitudinal section.

It may here be noted that the brake mechanism of the present invention is shown, for purposes of exemplification, as applied to a tandem, differential axle mechanism also of my invention and which is disclosed in detail in my copending application Serial No. 403,443, filed July 21, 1941, under the title Vehicle truck assembly.

This truck assembly as shown in the drawings is arranged to support an end of a trailer type of vehicle of substantially conventional form having main longitudinal beams A, side members B and a platform C all rigidly braced and connected. The four wheels, each having dual tires and designated generally at D are journaled at the ends of the tandem arranged axles E and said axles are pivotally and supportably connected at their ends to transversely spaced and longitudinally extended bolsters F which are fulcrumed intermediate their ends on aligned transverse axes on pins G carried in bracket H depended from beams A. Torque arms J connect the axles E at a centrally located and longitudinally extended pivot axis K. Transversely extending cross beams L support guide means (not here shown) which guide the bolsters in their up and down movements on the pivots G.

Further details as to constructional features of this truck assembly may be had by reference to my hereinbefore identified application. Suffice it to say herein that the construction is such that the wheels D may each move upwardly and downwardly relative to the frame or platform as required by irregularities in the road surface with the axles and bolsters swinging or oscillating in vertical planes as required to properly and equally transmit the load to the wheels at all times.

Each of said wheels D is provided with a conventional brake mechanism which may include brake shoes M pivoted to pins N arranged in lugs O at the ends of the axles E and it is for the purpose of properly equalizing and distributing braking movements to these shoes, without interference by or with the differential wheel movements, that my present mechanism is adapted.

As its primary actuating and force distributing member this mechanism comprises a cross bar or center member 5 which at its ends carries laterally extending fingers 6 adapted to overlie lower, inner flanges of the beams A and which are slidably received in upright guide members 7 secured to said flanges. These guide members, as seen in Fig. 1, are U-shaped in plan and the fingers 6 enter through their open inner sides in such manner as to prevent displacement of the bar 5 lengthwise of the trailer frame but to interfere in no way with upward and downward movements of the bar. The bar 5 is supported crosswise between the beams A by a yoke member 8 of inverted U-shape which has its free ends set astraddle the center of the bar and pivoted thereto by a pin 9 on a longitudinal and horizontal axis located immediately above and in vertical alignment with the aforesaid pivot axis K, which is the exact center of the truck assembly, as a whole. At its upper, bight or folded end the yoke member 8 carries a transversely extended pin 10 which pivotally supports it from one arm of a bell crank lever 11. This lever 11 in turn is fulcrumed by a pin 12 between brackets 13 which depend from angle bars 14 secured atop support channels 15 mounted on the aforesaid cross beams L. The bell crank lever 11 thus may rock in a vertical and longitudinal plane to raise and lower the bar 5, meanwhile serving as the support therefor and about which the bar may freely oscillate in upright transverse planes.

Adjacent each of its ends the bar 5 has a pair of spaced, apertured bearing ears 16 between each of which pairs a rock beam or side member 17 is fulcrumed upon a pin 18. Said rock beams 17 extend longitudinally and are fulcrumed intermediate their ends to move upwardly and downwardly with the bar 5 but to swing freely at their ends in upright longitudinal planes.

The brake shoes M are actuated by cams carried on cam shafts 19, one for each wheel D, and said shafts are journaled in bearings 20 provided on the axles E adjacent the ends thereof. Said cam shafts extend parallel with the axles in the horizontal plane of the wheel axes and furthermore are located on the facing sides of the axles. That is, the cam shafts are on the rear side of the forward axle and on the forward side of the rear axle. Secured to the inner ends of the cam shafts 19 are operating levers 21 which extend in directions away from the adjacent axles and thus bring their free ends substantially beneath the forward and rear ends of the rock beams 17. Links 22 are then connected between the ends of the levers 21 and rock beams 17 by pivot pins 23, completing the equalizing assembly. Said links 22 have a series of openings 24 in each to permit adjustments of the effective length of the links according to the angular positions of the operating levers 21.

The construction and arrangement of parts is such that the brake operating levers 21 normally stand about in the positions shown when the brake shoes are free of the brake drums, this being, of course, the normal running positions of the parts. An upward swinging movement of the levers 21 will then operate to set the brakes.

It is apparent that such movement may be applied to the operating levers 21 by rocking the bell crank lever 11 on its fulcrum 12 to lift the bar 5 whereupon the resulting pull exerted by the rock beams 17 on the links 22 will pull upward on the levers. When such pull is released the parts will then return to normal position. The most important feature, however, lies in the manner in which this mechanism adapts itself to the necessary differential movements of the wheels. As evident first in Fig. 2 the bar 5 may rock freely on its pivot 9 to correspond to transverse tilting movement of the axles E while maintaining the proper relative positions between the rock beams 17, links 22 and operating levers 21. At the same time, or separately, as the movements of the wheels D may dictate, the rock beams 17 may oscillate on their pivots 18 to correspond to rocking movements of the bolsters F on the pins G and maintain proper relation of the parts, as clearly seen in Fig. 3. Thus at all times the wheels D may move upwardly and downwardly without interference as they travel over irregular road surfaces, and the H-shaped frame comprising the combination of the bar 5 and beams 17 will shift to correspond. In any position the brakes may be applied and the power will be equally distributed to the four brakes, no matter in what positions the wheels may be.

Where more than four wheels are employed, as for instance where each axle carries four wheels making a total of eight, the cam shafts 19 may each carry two cams and the levers 21 will then be arranged between wheels.

For actuating the bell crank lever 11, I have shown a pull rod 25 pivoted at 26 to an upper end of the lever and extending forwardly to a point of pivotal connection with a draw bar 27. Said bar 27 is pivoted at 28 to a bracket 29 to swing forwardly and rearwardly, having one end rested at 30 upon an inner lower flange of the beam A to guide it in such movement. A conventional pressure or vacuum cylinder 31 then has its plunger 32 connected at 33 to the bar 27 and a cable 34 from a hand or emergency brake control (not shown) is similarly connected at 35. Obviously by actuating either the cylinder 31 or cable 34 the bar 27 may be swung forwardly, or away from the truck, to oscillate the bell crank lever 11, raise the bar 5, and apply the brakes.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a vehicle truck assembly having four wheels disposed in front and rear pairs and arranged to move upwardly and downwardly with respect to the vehicle as they travel over irregular road surfaces, brakes on the wheels, a cross member supported on the vehicle, means for raising and lowering said cross member, side members pivotally supported at the ends of the cross member, operating connections between the ends of the side members and the wheel brakes, and the said cross and side members being operatively arranged to move upwardly and downwardly in accordance with corresponding movements of the wheels to normally maintain constant relative spacing between the ends of the side members and the brakes in all positions of the wheels.

2. Brake mechanism for a vehicle truck having tandem axles mounted for up and down movements at their ends and having ground wheels supporting said ends, said mechanism comprising a cross bar extending parallel with and above the axles and disposed intermediate the upright vertical planes thereof, means for raising and lowering said cross bar with respect to the axles and pivotally supporting the bar for up and down movements at its ends corresponding to the movements of the axles, side members pivotally mounted adjacent the ends of the cross bar and extending therefrom in generally horizontal planes toward the respective wheels and arranged for up and down movements at their ends in longitudinal and vertical planes, brake actuating shafts on the ends of the axles, levers on said shafts and extending in generally horizontal planes beneath said side members, and links connected between the ends of the side members and said levers.

3. In a vehicle truck assembly including tandem axles having ground wheels at their ends and mounted for up and down movements with respect to the vehicle at their wheel supported ends, a brake mechanism comprising brakes on the wheels, a cross bar extending transversely of the vehicle between and above the axles and supported from an intermediate point up and down movements at its ends, rock beams disposed lengthwise of the vehicle between the ends of the axles and pivotally supported intermediate their ends upon the cross bar for up and down movements corresponding to up and down movements of the wheels, cam shafts journaled on the axles for actuating the wheel brakes, levers on the cam shafts, links connecting the ends of the rock beams to said levers, and means for raising the cross bar and rock beams as a unit to distribute brake setting forces through said links and levers equally to all of the wheel brakes.

4. A brake assembly for actuating the brakes of two pairs of tandem arranged ground wheels operatively supported for relative up and down movements as they travel over irregular ground surfaces, comprising side members disposed lengthwise between respective front and rear wheels of each pair and having end connections for operating the wheel brakes, a cross bar extending transversely between front and rear pairs of wheels and at its ends having pivotal connections with said side members to permit the ends thereof to move upwardly and downwardly in accordance with similar movements of the wheels, means pivotally supporting the center of said cross bar for up and down movements at its ends, means for raising and lowering the cross bar and side members with respect to the wheels, and upright guide means for the ends of said cross bar.

5. The combination with a vehicle truck having a pair of tandem axles mounted for tilting movements at their ends in upright transverse planes, ground wheels supporting the ends of the axles, and laterally arranged bolster members connecting the ends of the axles and mounted for tilting movements in upright longitudinal planes, of brake mechanism for actuating the individual brakes of the wheels, comprising a cross bar extending transversely between the axles and supported at its center for tilting movements corresponding to the movements of the axles, rock beams extending in longitudinal directions at the ends of the cross bar and pivoted thereto for tilting movements at their ends in upright longitudinal planes corresponding to the movements of the bolster members, said rock beams having their ends disposed over the wheel brakes and capable of up and down movements exactly corresponding to the up and down movements of the individual wheels to maintain substantially constant positions relative thereto, operating connections between the said ends of the rock beams and the wheel brakes, and means for raising and lowering the cross bar and rock beams as a unit for actuating the brakes through said operating connections.

6. A brake assembly for actuating the brakes of two pairs of tandem arranged ground wheels operatively supported for relative up and down movements as they travel over irregular ground surfaces, comprising side members disposed lengthwise between respective front and rear wheels of each pair and having end connections for operating the wheel brakes, a cross bar extending transversely between front and rear pairs of wheels and at its ends having pivotal connections with said side members to permit the ends thereof to move upwardly and downwardly in accordance with similar movements of the wheels, means pivotally supporting the center of said cross bar for up and down movements at its ends, means for raising and lowering the cross bar and side members with respect to the wheels, and guide members supported adjacent the ends of the cross bar and having upright channels slidably and guidably receiving and engaging said ends.

ROY C. TOWNSEND.